Jan. 6, 1953     C. J. BUCHINGER     2,624,355
MILKING MACHINE CLEANER OF THE CLEANING LIQUID CIRCULATING TYPE
Filed May 7, 1948     4 Sheets-Sheet 1
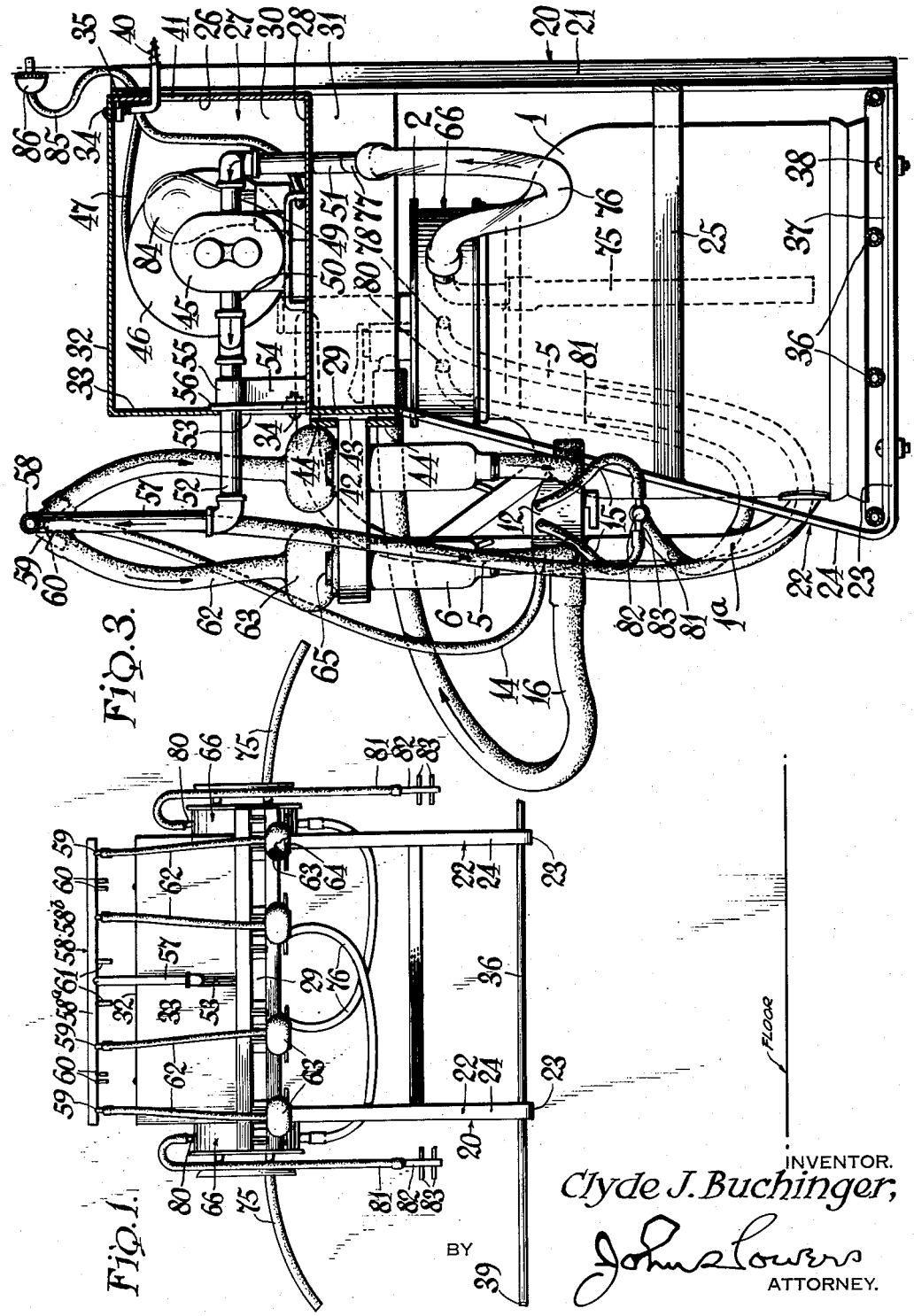
INVENTOR.
Clyde J. Buchinger,
BY
ATTORNEY.

Jan. 6, 1953     C. J. BUCHINGER     2,624,355
MILKING MACHINE CLEANER OF THE CLEANING LIQUID CIRCULATING TYPE
Filed May 7, 1948     4 Sheets-Sheet 2
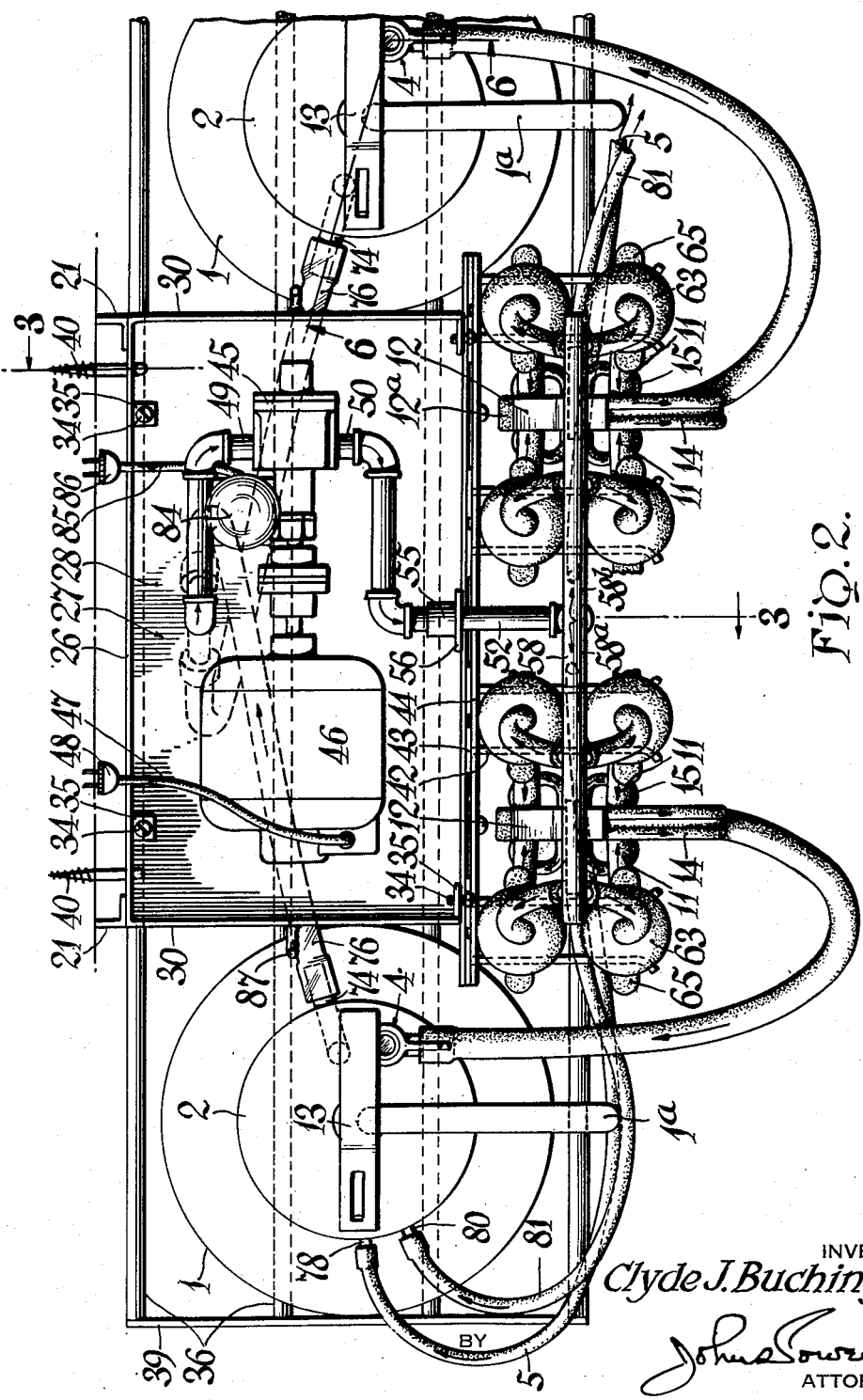
INVENTOR.
Clyde J. Buchinger,
BY
ATTORNEY.

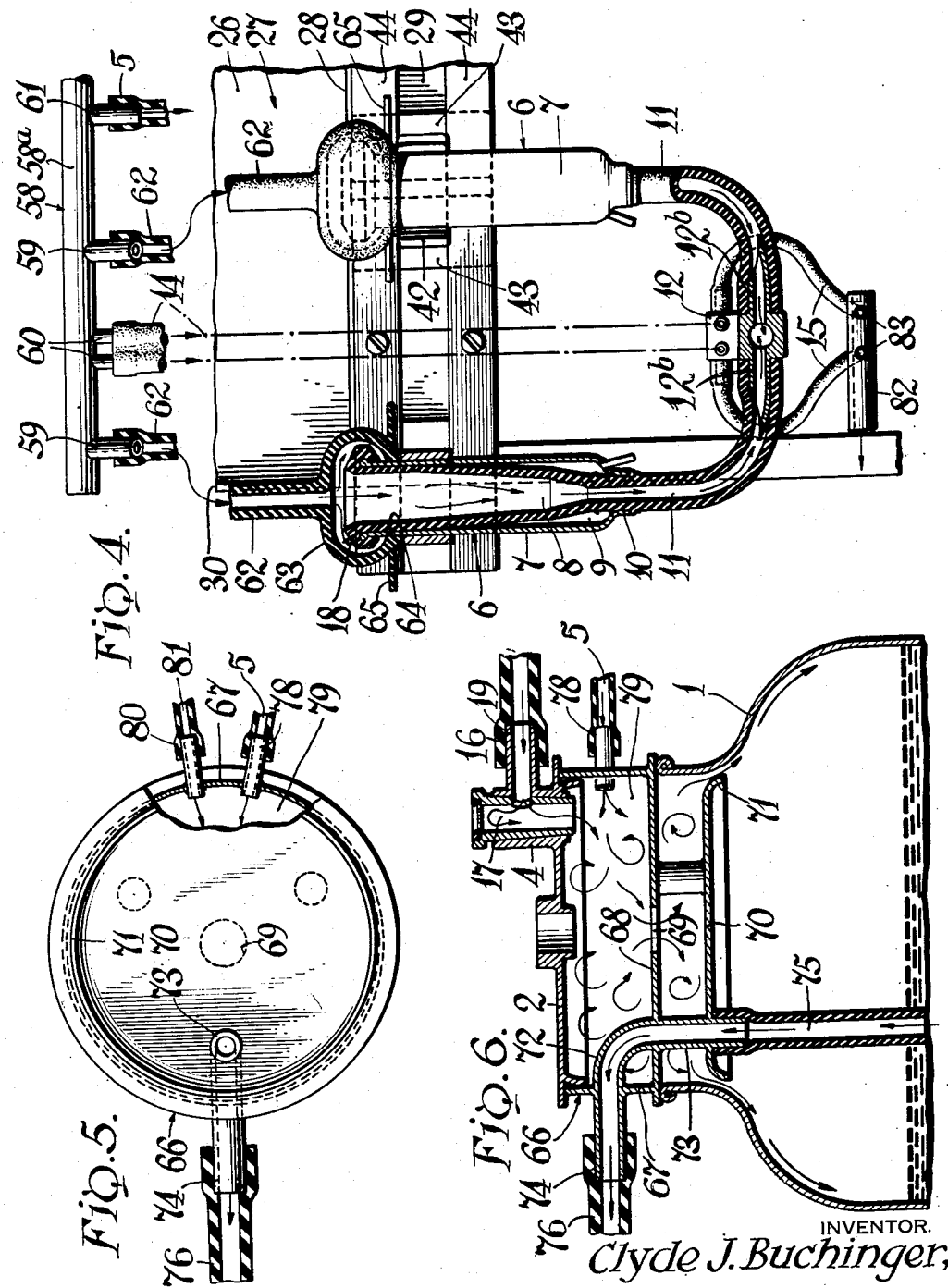

Jan. 6, 1953          C. J. BUCHINGER          2,624,355
MILKING MACHINE CLEANER OF THE CLEANING LIQUID CIRCULATING TYPE

Filed May 7, 1948          4 Sheets-Sheet 4

INVENTOR.
Clyde J. Buchinger,
BY
John Sowers
ATTORNEY

Patented Jan. 6, 1953

2,624,355

UNITED STATES PATENT OFFICE 2,624,355

MILKING MACHINE CLEANER OF THE CLEANING LIQUID CIRCULATING TYPE

Clyde J. Buchinger, Perry Center, N. Y.

Application May 7, 1948, Serial No. 25,543

13 Claims. (Cl. 134—168)

This invention relates to improvements in milking machine cleaners of the cleaning liquid circulating type.

The principal object is to provide a cleaner wherein the cleaning liquid has sustained and effective access to all surfaces which may require cleaning and to all surfaces to which the milk has, or may have, access, thereby to effect the complete mechanical removal of deposited solid and liquid matters, and, as a germicidal solution, to cause the milking machine to be substantially germ-free at the completion of the cleaning operation.

A further object is to provide a cleaner wherein the cleaning liquid is drawn from and returned to a reservoir and has a continuous circuitous flow of novel and advantageous character in that during its passage through the parts of the milking machine it is at all times under positive pressure, thereby to have optimum effective cleaning contact, and its flow is in a direction such that all adhering solids and liquids which may remain in the milking machine after the milking operation are carried away and deposited in suspension in the body of cleaning fluid in the reservoir.

A further object is to provide a cleaner having the above operational characteristics and wherein the pail of the milking machine is utilized as the reservoir for the cleaning liquid.

A further object is to accomplish the results above stated in a minimum degree of time and with a minimum degree of labor, the saving of time and labor being an important economical factor in the operation of a dairy farm. In concrete terms, with a single attendant, a machine in accordance with the invention effects the cleaning of a milking machine, in the optimum manner and degree above stated, in less than half of the time required by cleaners heretofore in use.

A cleaner in accordance with the invention may be used in connection with any type of milking machine and is herein shown, by way of example, as used with a milking machine of the general type shown in the patent to Conde No. 2,340,454 of February 1, 1944.

An embodiment of the invention and a standard milking machine of the Conde type are illustrated in the accompanying drawings wherein:

Figure 1 is a front elevation of the cleaner as disconnected from the milking machine. In this figure the cleaner is shown in a form which enables its use simultaneously with two milking machines.

Figure 2 is a plan view of the cleaner in operative relation to two milking machines, the cover for the motor and its connected parts being removed.

Figure 3 is a vertical sectional view on the line 3—3 of Figure 2 showing the cleaner in operative relation to a milking machine.

Figure 4 is a diagrammatic view showing the path of flow of the cleaning fluid from the supply manifold to the teat cups, to the claw, and to the air tubes which extend between the claw and the chambers surrounding the rubber inflations of the several teat cups, one of the teat cups being shown in central longitudinal section and the other shown in elevation.

Figure 5 is a bottom plan view, partly in section, of an adapter which forms a part of the cleaner and which, during the cleaning operation, rests upon the top of the pail of the milking machine and supports the cover of the pail.

Figure 6 is a partial vertical sectional view on the line 6—6 of Figure 2, this view showing the pail and the adapter in operative position upon it.

Figure 7:
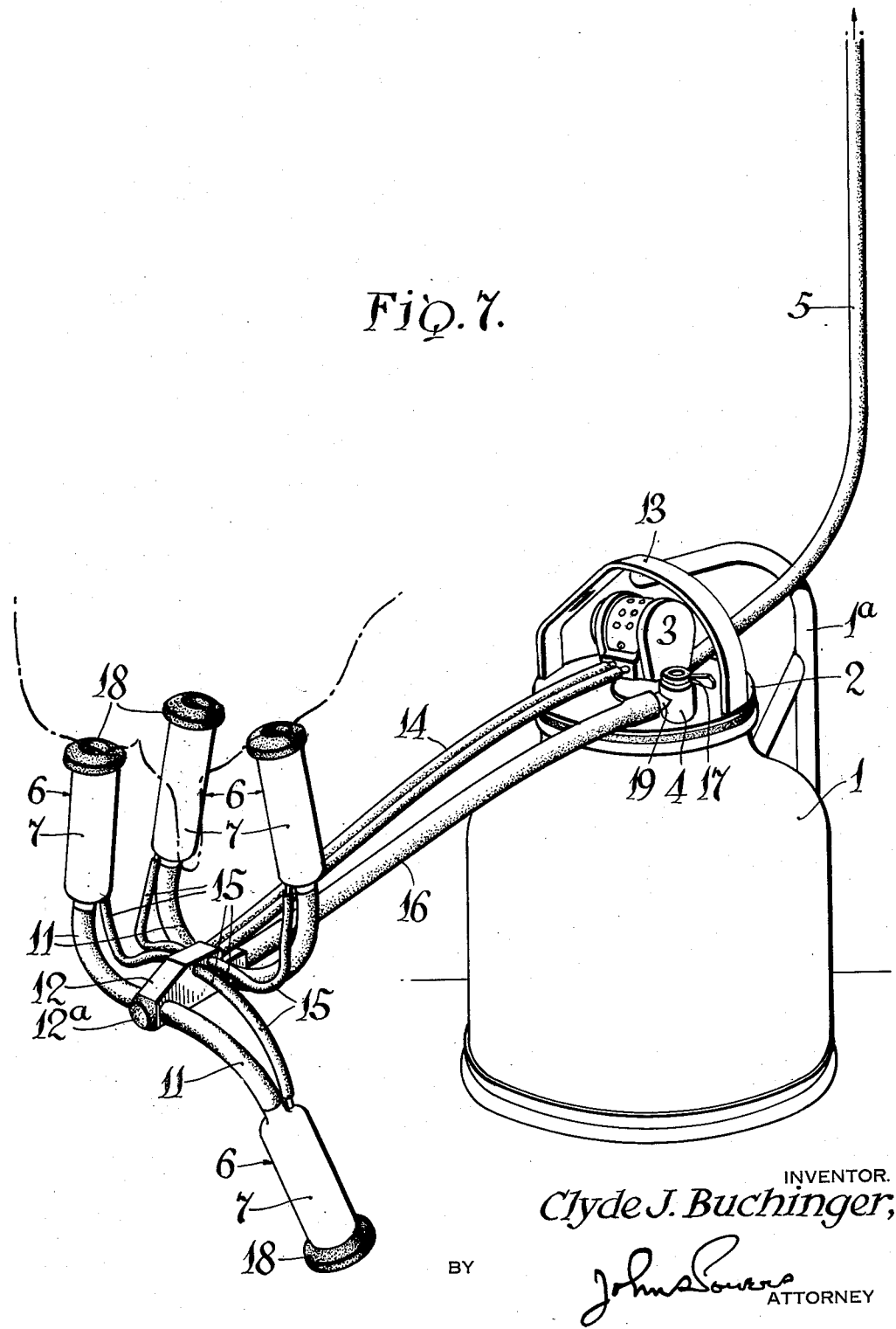
Figure 7 is a perspective view of a standard milking machine of the Conde type, this machine being shown as in use. The purpose of this figure is to enable a more ready understanding of the operation of the cleaner of the invention and the manner in which the cleaner is operatively connected to the various parts of the milking machine.

Referring to Figure 7: The milking machine includes a pail 1 having a handle 1a and a cover 2 carrying a pulsator 3 and a milk valve 4. The pulsator is connected by a stanchion tube 5 to the usual suction line (not shown). The teat cups 6 comprise cylindrical metal casings 7 (Figure 4) and enclosed rubber flexible resilient open-ended casings 8 which directly engage the teats and are known in the trade as "inflations." The casings 7 provide chambers 9 in surrounding relation to the inflations 8 and are provided with terminal sleeves 10 which have tight frictional engagement with the rubber tubes 11 which communicate with the interior of the inflations and carry the milk. The inflations 8 are provided at their outer ends with flanges 18 which are channeled to take over the beaded edges of the casings 7 and to establish sealing engagement with the casings. The milking machine includes the usual claw 12 having the separate milk and air chambers (not shown) and which, when the machine is not in use, is supported by the handle 13 carried by the cover 2. The tubes 11 are connected to the milk chamber of the claw. The pulsator 3 is connected to the air chamber of the claw by rubber tubes 14 and the air chamber of the claw is connected to the inflation chambers 9 of the teat cups by inflation tubes 15. The milk chamber of the claw is connected by the rubber tube 16 to a nipple 19 which projects from the casing of the valve 4, and, the valve element 17 of the valve 4 being in open position, the milk flows through the tube 16 and such valve element into the pail 1.

Referring to Figures 1 to 6:

The parts of the milking machine are carried by a supporting frame indicated generally at 20 and which includes vertical rear bars 21, preferably of angle iron form, and L-shaped side brackets 22 which project forward from the bars 21 and each include a horizontal bar 23 attached to the bar 21, preferably by welding, and upwardly extending front bars 24. The bars 21 and 24 are connected and reinforced by a horizontal rectangular bracing frame 25. The upper portions of the bars 21 are connected and mutually braced by a transverse plate 26 which may be secured by welding and which forms the rear wall of a box 27 having a bottom wall 28 upon which the motor and other operating parts are mounted. The wall 28 is connected to the bars 24 by a bracing apron section 29 which is welded to the wall 28 and to the upper ends of the bars 24. The box 27 includes side walls 30 connected to the walls 26 and 28 and having apron extensions 31 which project below the wall 28 and are secured by welding to the bars 21 and to the apron section 29. The box 27 is completed, and normally closed, by a cover which consists of integrally connected top and front walls 32 and 33, the cover being detachably connected, as by screws 34, to lugs 35 carried by the walls 26 and 28.

For the support of the pails 1 the frame 20 carries a suitable bottom shelf. This may conveniently consist of parallel horizontal tubular bars 36 welded to cross strips 37 which are positioned upon the bars 23 and secured to them by bolt fastenings 38. The bars 36 project to a suitable extent beyond the brackets 22 and are connected at their ends by cross strips 39. The projecting portions of the shelf thus constituted serve as supports for the pails 1, as shown in Figure 2, and the intermediate portion of the shelf, which extends between the brackets 22, may be utilized for supporting paraphernalia used in connection with the milking and cleaning machines.

The frame 20 may be supported upon the floor in which case it may be provided with casters, illustration of which is deemed unnecessary. However it is preferably supported, as shown, from a wall of the building by means of hooks 40 (Figures 2 and 3) screwed into the supporting wall and passing through vertical slots 41 in the rear wall 26 of the box 27. As is obvious the frame 20 may readily be disconnected from the hooks 40 and moved to a different position as occasion may require.

The frame 20 is provided with any suitable means for supporting the teat cups 6 during the operation of the cleaning machine. As shown and preferred the teat cups supporting means consists of a series of pairs of parallel arms 42 which project forward from the apron section 29. Each arm 42 has at its inner end a flat mounting plate 43. The plates 43 are securely held in clamped relation by the apron section 29 and by upper and lower parallel clamping strips 44 which are secured by screws to the section 29. The mutual spacing of the arms 42 of each cooperating pair may be adjustably varied in accordance with the diameter of the teat cups of the particular milking machines to be cleaned. The teat cups are arranged in clusters of four and each pair of arms 42 serves for the support of a pair of adjacent teat cups. These are inserted horizontally between the arms 42 which initially engage the overturned external flanges 18 of the inflations 8, thereby to hold the teat cups against dropping.

The flow of the cleaning solution is effected by a suitable rotary pump 45 which may be directly driven by a motor 46, the pump and the motor being mounted upon and supported by the bottom 28 of the box 27. The electric cable 47 for the motor 46 projects through an opening in the rear wall 26 of the box 27 and carries a standard plug 48. An inlet pipe 49 is connected to one side of the pump casing and an outlet pipe 50 is connected to the opposite side. The pipe 49 includes a vertical section 51 which projects through an opening in the bottom 28 and extends downward for a suitable distance. The outlet pipe 50 includes a horizontal section 52 which extends through a vertical slot 53 in the front wall 33 of the box and projects forward for a suitable distance. Support for the pipe 50 and the parts which it carries may be provided by a bracket 54 secured to the bottom 28 and having at its upper end a sleeve 55 through which the section 52 extends. The bracket 54 includes a plate 56 which provides a closure for the slot 53. The section 52 of the pipe 50 is connected at its front end to an upright section 57 which carries a horizontal supply manifold 58.

In the embodiment disclosed the cleaning machine is designed for simultaneously cleaning two milking machines. Accordingly the section 57 is connected to the manifold 58 at a point central thereof, the part 58a of the manifold at the left of the section 57 being connected to one of the milking machines and the part 58b of the manifold at the right of the section 57 being connected to the other milking machine. Each of the parts 58a and 58b of the manifold is provided with two pairs of nipples 59 for the supply of cleaning fluid to the teat cups, the nipples of each pair being angularly disposed with their axes in a common plane as shown in Figure 3, with a pair of nipples 60 for connection to the tubes 14 of the milking machine and with a nipple 61 for connection to the stanchion tube 5. The nipples 59 are directly connected to rubber tubes 62 which at their free ends are provided with means by which they may be connected in sealed relation to the teat cups and in open communication with them. This means preferably comprises a flexible rubber envelope 63 (Figure 4) having an opening 64 by which it may be engaged over the outer end of the teat cup, the annular wall of the opening having sealing engagement with the teat cup casing 7 and the envelope enclosing, but being spaced from, the external flange 18 of the teat cup inflation 8. The envelopes 63 are preferably each provided adjacent their central opening 64 with a pair of integrally formed projecting fingers 65 by means of which they may be readily manipulated when they are to be fitted over or disconnected from the flanges 18.

The pail 1 is utilized as a functional part of the cleaner, that is to say as a reservoir for the cleaning liquid and in this capacity is operatively connected in the flow circuit of the cleaning liquid by an adapter designated generally as 66. The adapter includes a cylindrical wall 67 and a bottom plate 68 having a diameter such that it may rest upon the upper edge of the pail 1 as a support, the uniform contact of the plate with the beaded edge of the pail establishing a seal, adequate for all practical purposes, against the escape of the cleaning fluid. The plate 68 is provided with a central opening 69 through which the cleaning fluid returns to the pail. The adapter carries a distributor plate 70 which is arranged in spaced relation below the plate 68 and has its marginal portion downturned on a curve as at 71, the diameter of the plate being such that its marginal portion 71 is slightly spaced from the neck of the pail 1. The plate 70 is supported by the plated 68 to which it is connected in any suitable manner and deflects the cleaning fluid toward the neck of the pail whereby a downwardly flowing film of cleaning fluid will cover the entire inner surface of the pail above the liquid level. The adapter also includes an angular pipe 72 having a vertical portion 73 internally arranged which projects through the plates 68 and 70 and for a suitable distance below the plates 70 and a horizontal portion 74 which projects externally for a suitable distance beyond the cylindrical wall of the adapter. The part of the vertical portion 73 which projects below the plate 70 is connected to a tube 75, preferably of rubber, which terminates near the bottom of the pail 1 (Figure 3) and the projecting portion 74 is connected by a rubber tube 76 to a fitting 77 which is coupled to the lower end of the section 51 of the pipe 49, a separate fitting 77 of course being provided for each of the milking machines to be cleaned.

In the use of the cleaner the adapter 66 is mounted upon the pail 1 in the manner described and as shown in detail in Figure 6. The pulsator 3 is disconnected from the pail cover 2, the tubes 14, and the stanchion tube 5. The cover 2, with its sealing gasket removed, is then fitted upon the upper edge of the cylindrical wall 67 and the pulsator tubes 14 at their ends which were connected to the pulsator are connected to the nipples 60 as shown schematically in Figure 4, their opposite ends remaining connected to the claw 12. The cylindrical wall 67 of the adapter carries a projecting horizontal nipple 78 which communicates with the chamber 79 delimited by the cylindrical wall 67, the bottom plate 68 and the pail cover 2. With the pulsator disconnected from the pail cover the central opening in the pail cover, which opening is normally covered by the pulsator, affords free communication between the chamber 79 and the atmosphere. The stanchion tube is connected to the nipple 78 of the adapter and to the corresponding nipple 61 of the manifold 58. In order to provide for the cleaning of the inflation tubes 15 the adapter is provided with a nipple 80 adjacent, and similar to, the nipple 78. A rubber tube 81 is connected to the nipple 80 and at its normally free end carries an auxiliary tubular claw 82 provided with oppositely projecting nipples 83 which are arranged in pairs. The inflation tubes 15 are disconnected from the projecting nipples of the teat cup casings 7 and at their ends which were connected to the casings 7 are connected to the nipples 83 of the claw 82, their opposite ends remaining connected to the claw 12. The teat cups 6 are connected to the tubes 62 in the manner described and the tube 16 is left in connected relation between the claw 12 and the valve 4 carried by the pail cover 2.

As a precautionary measure it is preferred to mount an electric light bulb 84 in the box 27, the electric cable 85 for the bulb 84 projecting through an opening in the rear wall 26 of the box 27 and carrying a standard plug 86. The bulb 84 is for use when the temperature is at or below freezing and its purpose is to heat the box 27 to a degree whereby any residual cleaning solution in the casing of the pump will not become frozen.

With the cleaner connected to the milking machine in the manner above described the flow of the cleaning solution is indicated in Figures 2 and 3 by the arrows applied to the several pipes. The operation and operative characteristics are as follows:

The cleaning fluid flows from the reservoir provided by the pail 1 through the pipe 75, the tube 76 and the pipe 49 to the low pressure side of the pump and thence from the high pressure side of the pump under a pressure of the order of ten pounds per square inch through the connected pipes 52 and 57 to the manifold 58 whence it flows in parallel paths to the chamber 79 of the adapter 66, these paths being (1) the tubes 62, inflations of the teat cups, the teat cup tubes 11, the claw 12, the tube 16 and the valve 4, (2) the pulsator tubes 14, the claw 12, the inflation tubes 15, the auxiliary claw 82 and the tube 81, and (3) the stanchion tube 5. The diameter of the opening 69 in the bottom plate 68 of the adapter is such that the cleansing fluid as delivered under pressure in the chamber 79 through the paths aforesaid will fill said chamber and, flowing under pressure adjacent the underside of the pail cover 2, will thoroughly clean the pail cover. As the cleaning fluid passes from the chamber 79 through the opening 69 it will be deflected by the distributor plate 70 toward the neck of the pail and will flow in a film along the entire area of that part of the inner surface of the pail which is above the liquid level, thereby thoroughly cleaning this area, all as above explained.

The claw 12, in accordance with standard practice, has its end opposite the end to which the tubes 14 and 16 are connected closed by a tightly fitting removable rubber cap 12a (Figures 2, 3 and 7). Within the chambers of the claw 12 the cleaning fluid is under pressure to a degree such that it thoroughly cleanses the exposed inner surface of the cap 12a and permeates all crevices between the cap and the body of the claw 12, thereby to clean the cap of all deposited solid or liquid matters and to make the milk-exposed surfaces of the cap germ free. In its flow under pressure through the inflation tubes 11 the cleaning fluid permeates the crevices between the tubes 11 and the nipples 12b (Figure 4) of the claw 12 to which the tubes 11 are attached, thereby having access to all milk-exposed surfaces of the tubes 11 and the nipples 12b and causing them to be germ free. As the cleaning fluid leaves the tubes 62 it has a circulation under pressure within the envelopes 63 whereby the external surfaces of the flange 18 are cleaned of any adhering solid or liquid matter and are made germ free.

It will be noted that the cleaning liquid flows through the teat cups, the teat cup tubes 11, the claw 12, the tube 16 and the valve 4 in the same direction as the milk and that, since the cleaning fluid is under pressure, its flow through the parts aforesaid involves the rapid movement of substantially air-free liquid columns, the cleaning liquid being forced into intimate cleaning contact with all surfaces to which the milk has, or may have, access during the milking operation.

The flow of the cleaning solution through the pulsator tubes 14, the inflation tubes 15 and the stanchion tube 5 similarly cleans the internal surfaces of these tubes and makes them germ free.

During the cleaning operation the body of liquid in the pail 1 is in the form of a column which is in constant downward movement and in constant replenishment. Due to these facts and to the rapidity with which the cleaning operation is accomplished the deposited particles which are caught up by the cleaning streams and carried to the body of liquid in the pail 1 will remain in suspension.

All adhering deposited particles removed by the cleaning liquid from the parts through which it flows are carried in suspension in the rapidly moving streams and are ultimately carried into the body of cleaning fluid within the pail 1 where they remain in suspension during the cleaning operation. When the cleaning operation has been completed the operation of the pump 45 is discontinued and the tubes 62 are then detached from the teat cups 6, the auxiliary claw 82 is detached from the inflation tubes 15, the stanchion pipe 5 is detached from the adapter 66 and the distributing pipe 58, the cover 2 is removed from the adapter, the tube 76 is detached from the adapter and the pipe 51, and the adapter is removed from the pail 1. The parts thus disconnected are self-draining and become dry by evaporation. The body of cleaning liquid is then poured from the pail 1, carrying away with it all particles removed during the cleaning operation and which remain in suspension, and the pail, inverted and resting upon the bottom shelf of the frame or other appropriate support, is fully drained and becomes dry by evaporation, the entire internal surface of the pail being thoroughly cleaned and made germ free. When the pail and the other parts of the milking machine have been drained and dried, the milking machine is reassembled with its parts in the relation shown in Figure 7, ready for use.

After the use of the cleaner, the adapters 66 are conveniently supported by the frame 20. For this purpose the side walls 30 of the box 27 are each provided with an outwardly projecting hook 87 (Figure 2) upon which an adapter may be hung as shown in Figure 1, the normally open ends of the cylindrical walls 67 being passed over the hooks and the hooks being engaged in the inner ends of either of the nipples 78 or 80. The connection of the parts of the milking machine and the other required parts to the cleaner, and their disconnection from the cleaner, may be effected in a few moments, that is to say within one or two minutes and with a minimum amount of labor of a single attendant. The cleaning operation, carried to an extent to effect the thorough removal of all deposited particles and to gain the full benefits of the germicidal effect of the cleaning solution, is accomplished within from five to eight minutes, according to varying circumstances. The time thus required for a thorough operation is less than half of the time required by cleaners heretofore in use for a cleaning operation by no means as efficient. Since the cows must be milked morning and evening and the milking machine should be cleaned after each milking operation, the above stated saving of time and labor in the cleaning operation is an important factor in the economical operation of a dairy farm.

I claim:

1. A cleaner for milking machines comprising, in combination, a continuously driven pump, a reservoir for the cleaning liquid, piping extending from the reservoir near its bottom and connected to the low pressure side of the pump whereby the cleaning liquid is drawn from the reservoir and forced through the pump, a supply manifold connected to the high pressure side of the pump and provided with means for the connection thereto of the pulsator tubes of the milking machines, the pulsator tubes as connected to the manifold remaining connected to the claw of the milking machine, a tube in communication with the upper end of the reservoir and provided with an auxiliary hollow claw for connection to the inflation tubes of the milking machine at the ends thereof which are normally connected to the inflation chambers of the teat cups, the inflation tubes as thus connected to the auxiliary claw remaining connected at their opposite ends to the claw of the milking machine, whereby the pulsator tubes, the claw of the milking machine and the inflation tubes are utilized to provide a path of flow for the cleaning liquid and the cleaning liquid flows under pressure through these parts, cleaning them during its flow, into the upper end of the reservoir in which it replenishes the body of cleaning liquid maintained in the reservoir.

2. A cleaner for milking machines comprising, in combination, a continuously driven pump, a reservoir for the cleaning liquid, the reservoir being provided by the pail of the milking machine, piping extending from the reservoir near its bottom and connected to the low pressure side of the pump whereby the cleaning liquid is drawn from the reservoir and forced through the pump, a supply manifold connected to the high pressure side of the pump, tubes connected to the supply manifold and having at their free ends means for their detachable connection in sealed relation to the teat cups of the milking machine, an adapter removably mounted upon the upper end of the reservoir and having a vertical wall and a bottom formed with an opening communicating with the reservoir, the adapter providing support for the cover of the pail and having an internal chamber delimited by the bottom, the vertical wall and the milk pail cover and which communicates with the reservoir through said opening, and means of communication between the teat cups and the upper end of the reservoir, said means utilizing the tubes normally connected to the teat cups, the thereto attached claw of the milking machine and tubular connection between the claw and the milk valve carried by the milk pail cover whereby the cleaning liquid continuously flows under pressure from the manifold through the teat cups, the tubes normally connected thereto, the claw and the milk valve, cleaning these parts during its flow, into the chamber of the adapter wherein it cleans the milk pail cover, and thence into the upper end of the reservoir in which it replenishes the body of cleaning liquid maintained in the reservoir.

3. A cleaner for milking machines as set forth in claim 2 wherein the supply manifold is provided with means for the connection thereto of the pulsator tubes of the milking machine, the pulsator tubes as connected to the manifold remaining connected to the claw of the milking machine, and a tube carried by the vertical wall of the adapter is in communication with the chamber of the adapter and is provided at its free end with an auxiliary hollow claw which is connected to the inflation tubes of the milking machine at the ends thereof which are normally connected to the inflation chambers of the teat cups, the inflation tubes at their opposite ends remaining connected to the claw of the milking machine, whereby the pulsator tubes, the claw of the milking machine and the inflation tubes are utilized to provide a path of flow for the cleaning liquid and the cleaning liquid continuously flows under pressure through these parts, cleaning them during its flow, into the chamber of the adapter and thence into the reservoir in which it replenishes the body of cleaning liquid maintained in the reservoir.

4. A cleaner for milking machines comprising, in combination, a continuously driven pump, a reservoir for the cleaning liquid, the reservoir being provided by the pail of the milking machine, piping extending from the reservoir near its bottom and connected to the low pressure side of the pump whereby the cleaning liquid is drawn from the reservoir and forced through the pump, a supply manifold connected to the high pressure side of the pump, an adapter removably mounted upon the upper end of the reservoir and having a vertical wall and a bottom formed with an opening communicating with the reservoir, the adapter providing support for the cover of the pail and having an internal chamber delimited by the bottom, the vertical wall and the milk pail cover and which communicates with the reservoir through said opening, means carried by the supply manifold for the connection thereto of sundry tubular parts of the milking machine and means for establishing communication between said tubular milking machine parts and the internal chamber of the adapter whereby the cleaning liquid flows under pressure from the supply manifold through said parts, cleaning these parts during its flow, into the chamber of the adapter wherein it cleans the milk pail cover, and thence into the upper end of the reservoir in which it replenishes the body of cleaning liquid maintained in the reservoir.

5. A cleaner for milking machines as set forth in claim 4 wherein the adapter is provided with a distributor plate arranged in spaced relation below its bottom and having its marginal portion slightly spaced from the neck of the reservoir, the distributor plate serving to deflect the cleaning liquid flowing through said opening in the reservoir toward the neck of the reservoir whereby a downwardly flowing film of cleaning liquid will cover the entire inner surface of the reservoir above the liquid level.

6. A cleaner for milking machines which utilizes the pail of the milking machine and sundry tubular parts of the milking machine in the flow circuit of the cleaning liquid, the pail as thus utilized providing a reservoir for the cleaning liquid and which comprises, in combination, a continuously driven pump, piping extending from the reservoir near its bottom and connected to the low pressure side of the pump whereby cleaning liquid is drawn from the reservoir and forced through the pump, a supply manifold connected to the high pressure side of the pump, an adapter removably mounted upon the upper end of the pail and having a cleaning liquid receiving chamber in communication with the pail, means for connecting the tubular parts of the milking machine to the supply manifold, and means for connecting the tubular parts of the milking machine to the chamber of the adapter whereby the cleaning liquid flows under pressure from the supply manifold through the tubular parts, cleaning them as it flows, into the chamber of the adapter and thence into the upper end of the reservoir in which it replenishes the body of cleaning liquid maintained in the reservoir.

7. A cleaner for milking machines as set forth in claim 6 wherein the adapter as mounted upon the upper end of the pail supports the pail cover and the means for connecting the tubular parts of the milking machine to the chamber of the adapter utilizes the milk valve on the pail and the milk supply tube connected to said valve.

8. A cleaner for milking machines as set forth in claim 6 wherein the adapter is provided with a distributor plate having its marginal portion slightly spaced from the neck of the reservoir, the distributor plate serving to deflect the cleaning liquid toward the neck of the reservoir whereby a downwardly flowing film of cleaning liquid will cover the entire surface of the reservoir above the liquid level.

9. A cleaner for milking machines as set forth in claim 6 wherein the adapter is provided below the cleaning liquid receiving chamber with a distributor plate upon which the cleaning liquid is discharged from said chamber, the distributor plate having its marginal portion slightly spaced from the neck of the reservoir and serving to deflect the cleaning liquid toward the neck of the reservoir whereby a downwardly flowing film of cleaning liquid will cover the entire surface of the reservoir above the liquid level.

10. A cleaner for milking machines comprising, in combination, a continuously driven pump, a reservoir for the cleaning liquid, the reservoir being provided by the pail of the milking machine, piping extending from the reservoir near its bottom and connected to the low pressure side of the pump whereby the cleaning liquid is drawn from the reservoir and forced through the pump, a supply manifold connected to the high pressure side of the pump, an adapter removably mounted upon the upper end of the reservoir and having a cleaning liquid receiving chamber and a distributor plate, the margin of which is slightly spaced from the neck of the reservoir, the distributor plate serving to deflect the cleaning liquid issuing from the chamber toward the neck of the reservoir whereby a downwardly flowing film of cleaning liquid will cover the entire inner surface of the reservoir above the liquid level, means carried by the supply manifold for the connection thereto of sundry tubular parts of the milking machine and means for establishing communication between said tubular milking machine parts and the cleaning liquid receiving chamber of the adapter whereby the cleaning liquid flows under pressure from the supply manifold through said parts, cleaning them during its flow, into the chamber of the adapter and thence into the upper end of the reservoir in which it replenishes the body of cleaning liquid maintained in the reservoir.

11. A cleaner for milking machines comprising, in combination, a continuously driven pump, a reservoir for the cleaning liquid, piping extending from the reservoir near its bottom and connected to the low pressure side of the pump whereby the cleaning liquid is drawn from the reservoir and forced through the pump, a supply manifold connected to the high pressure side of the pump, tubes connected to the supply manifold and having at their free ends means for their detachable connection in sealed relation to the teat cups of a milking machine, means of communication between the teat cups and the upper end of the reservoir, said means utilizing the tubes normally connected to the teat cups, the thereto attached claw of the milking machine and the tube for conveying milk from the claw, the supply manifold being provided with means for the connection thereto of the pulsator tubes of the milking machine, the pulsator tubes as connected to the manifold remaining connected to the claw of the milking machine, and a tube in communication with the upper end of the reservoir and provided at its free end with an auxiliary hollow claw which is connected to the inflation tubes of the milking machine at the ends thereof which are normally connected to the inflation chambers of the teat cups, the inflation tubes at their opposite ends remaining connected to the claw of the milking machine, the cleaning liquid continuously flowing under pressure and with cleaning effect from the manifold through the teat cups, the tubes normally connected thereto and the first named claw, and from the first named claw through the pulsator tubes, the auxiliary hollow claw, and the tube which carries the hollow claw and also through the tube for conveying milk from the first named claw into the upper end of the reservoir in which it replenishes the body of cleaning liquid maintained in the reservoir.

12. A cleaner for milking machines comprising, in combination, a continuously driven pump, a reservoir for the cleaning liquid, piping extending from the reservoir near its bottom and connected to the low pressure side of the pump whereby the cleaning liquid is drawn from the reservoir and forced through the pump, a supply manifold connected to the high pressure side of the pump, tubes connected to the supply manifold and having at their free ends means for their detachable connection in sealed relation to the teat cups of a milking machine, and means of communication between the teat cups and the upper end of the reservoir, said means utilizing the tubes normally connected to the teat cups, the thereto attached claw of the milking machine and the tube for conveying milk from the claw, the means for the detachable connection of the tubes connected to the supply manifold to the teat cups consisting of flexible rubber envelopes, each having an opening by means of which it may be engaged over the outer end of a teat cup with the annular wall of the opening in sealing engagement with the casing of the teat cup, the envelope as connected to the teat cup enclosing, but being spaced from, the external flange of the teat cup inflation.

13. A cleaner for milking machines comprising, in combination, a continuously driven pump, a reservoir for the cleaning liquid, piping extending from the reservoir near its bottom and connected to the low pressure side of the pump whereby the cleaning liquid is drawn from the reservoir and forced through the pump, a supply manifold connected to the high pressure side of the pump, and means for the communicating connection between the supply manifold and the reservoir of sundry tubular parts of the milking machine whereby the cleaning liquid flows under pressure from the supply manifold through said parts, cleaning them as it flows, into the upper end of the reservoir in which it replenishes the body of cleaning liquid maintained in the reservoir, the means including an adapter removably mounted upon the upper end of the reservoir and having a cylindrical wall, a bottom plate which carries the cylindrical wall, rests upon the upper edge of the reservoir as a support and is formed with an opening through which the cleaning liquid returns to the reservoir, a cover which consists of the cover of the milk pail and which is removably supported upon the upper edge of the cylindrical wall, and certain of said tubular parts which provide cleaning fluid flow lines and are connected to the cover and to the cylindrical wall, the adapter with the cover supported thereon providing an internal chamber with which said flow lines communicate, and which communicates with the reservoir by means of said opening in the bottom plate, the diameter of said opening being such that the cleaning liquid will fill said chamber and flow under pressure in contact with the under side of the cover, thereby to clean the cover.

CLYDE J. BUCHINGER.

REFERENCES CITED

The following references are of record in the file of this patent:

UNITED STATES PATENTS

| Number | Name | Date |
|---|---|---|
| Re. 16,839 | Bork | Dec. 27, 1927 |
| 655,200 | Condron | Aug. 7, 1900 |
| 1,194,542 | Raymond | Aug. 15, 1916 |
| 1,538,734 | Oden | May 19, 1925 |
| 1,579,796 | Shiels | Apr. 6, 1926 |
| 1,627,824 | Beaty | May 10, 1927 |
| 1,946,400 | Hapgood | Feb. 6, 1934 |
| 2,018,403 | Hussar | Oct. 22, 1935 |
| 2,201,774 | Hofele | May 21, 1940 |
| 2,228,520 | Hodsdon | Jan. 14, 1941 |
| 2,292,849 | Schmitt | Aug. 11, 1942 |

FOREIGN PATENTS

| Number | Country | Date |
|---|---|---|
| 19,188 | Austria | Feb. 10, 1905 |
| 110,006 | Australia | Mar. 5, 1940 |
| 145,221 | Austria | Apr. 10, 1936 |